UNITED STATES PATENT OFFICE.

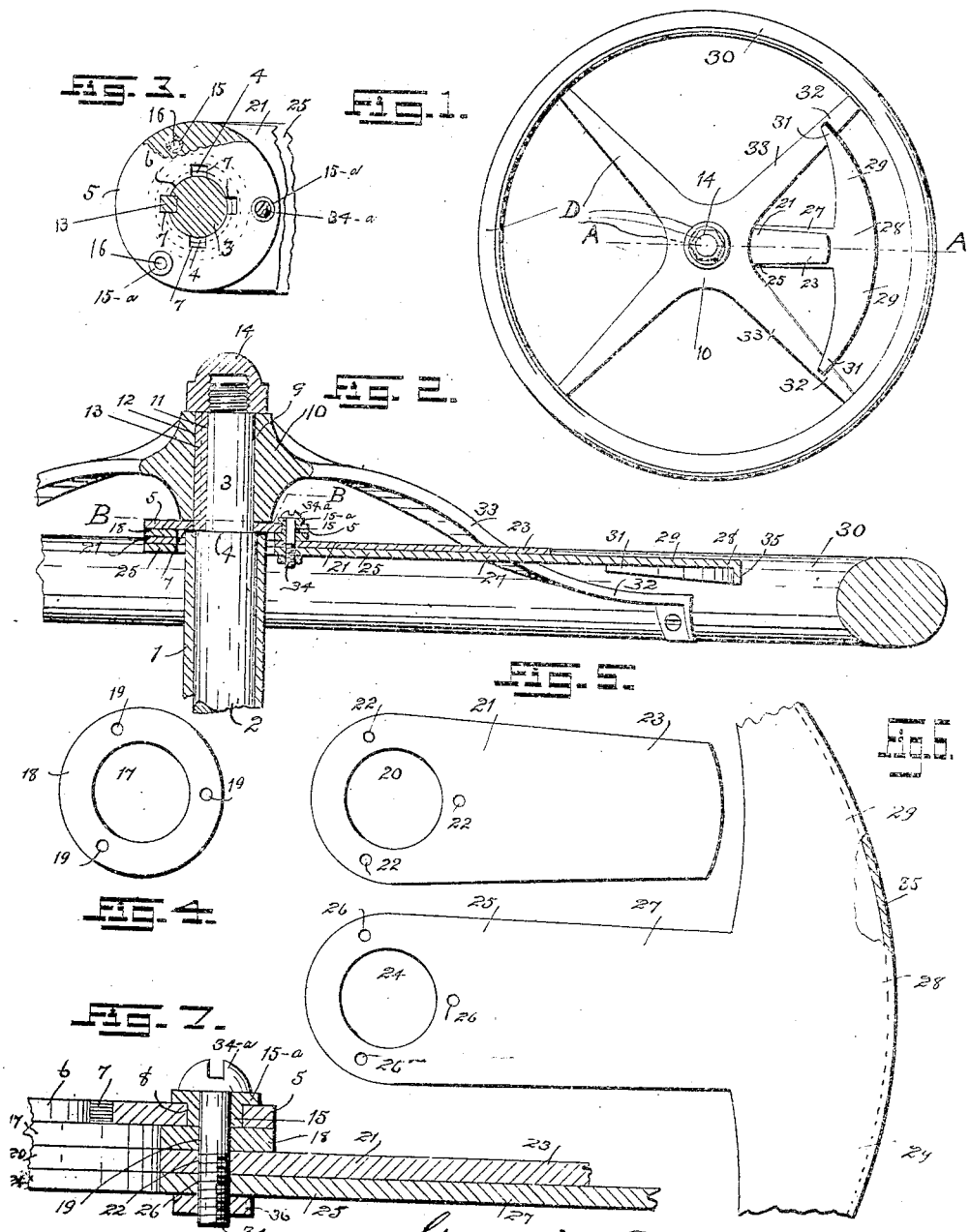

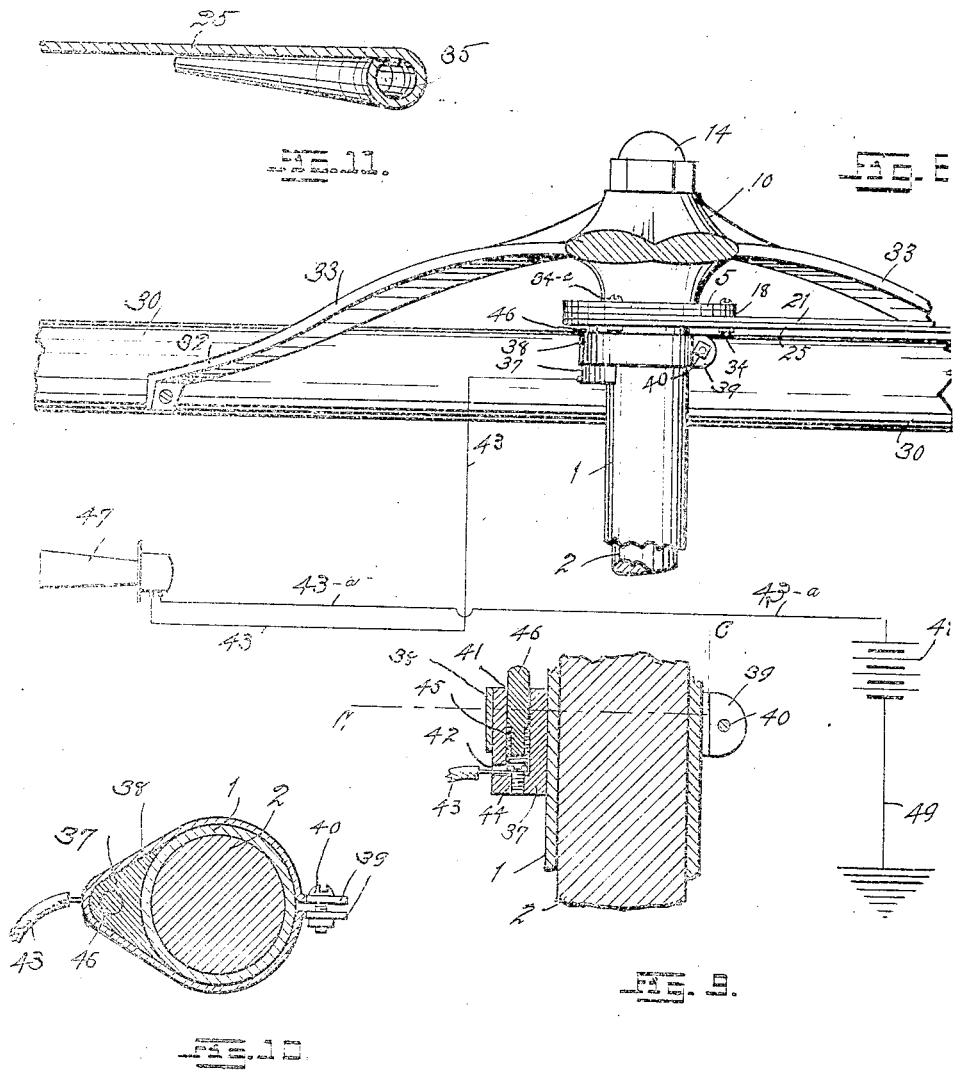

GEORGE F. VOIGHT, OF SAN FRANCISCO, CALIFORNIA.

ELECTRIC SIGNALING DEVICE FOR AUTOMOBILES.

1,230,957.  Specification of Letters Patent.  Patented June 26, 1917.

Application filed June 21, 1916. Serial No. 104,940.

*To all whom it may concern:*

Be it known that I, GEORGE F. VOIGHT, a citizen of the United States, residing at San Francisco, county of San Francisco, and State of California, have invented new and useful Improvements in Electric Signaling Devices for Automobiles, of which the following is a specification.

My invention relates to electric signaling devices for automobiles, in which the controlling or switch element is attached to the steering-wheel assembly of an automobile. One of the objects of the invention being to provide means whereby the driver of an automobile can operate an electrically actuatable horn, or other electrical signaling device, by manipulating a switch element located within the steering-wheel assembly and in easy access of the hand of the driver; a further object being to provide a device and means that can readily be attached to, or detached from, an automobile, and one that is comparatively inexpensive to manufacture.

With the foregoing and other objects in view which will appear as the description proceeds, the invention resides in the combination and arrangement of parts and in the detail of construction hereinafter described and claimed, it being understood that changes in the precise embodiment of the invention herein disclosed can be made within the scope of what is claimed without departing from the spirit of the invention.

The invention is illustrated more or less diagrammatically in the accompanying drawings, wherein—

Figure 1 is a top view of a steering-wheel assembly of an automobile, embodying the present invention.

Fig. 2 is a side view of a portion of the steering-wheel assembly, embodying parts of the present invention, certain parts being shown in section, taken on line A—A of Fig. 1.

Fig. 3 is a top view of certain parts, some of said parts having portions broken away, other of said parts being shown in section, taken on line B—B, Fig. 2.

Figs. 4, 5 and 6 are top views of certain parts, disassembled.

Fig. 7 is a fragmental side sectional view of certain parts.

Fig. 8 is a side view of the steering-wheel assembly embodying the present invention, certain parts being broken away, portion of the steering-wheel being shown in section, and illustrating an electric horn and its connections, the latter being shown diagrammatically.

Fig. 9 shows a side sectional view of a portion of the invention, together with a fragmental portion of the automobile standard and steering-wheel shaft.

Fig. 10 shows a top view of that portion of the present invention, also the standard and steering-wheel shaft, shown in Fig. 9, taken on line C—C of said last mentioned figure.

Fig. 11 is a side sectional view of a fragmental portion of the invention in a modified form.

Similar numerals refer to similar parts throughout the several figures.

The numeral 1 designates the upper portion of a hollow stationary standard, the lower end (not shown in the drawings) of which is secured to a suitable portion of the frame, or body, of an automobile, whence it extends upwardly a suitable distance and at a suitable angle from the vertical. Into the hollow of the standard 1, and extending therethrough at both its upper and lower ends, is rotatably fitted a cylindrical steering-wheel shaft 2. The lower end of said shaft being suitably connected with the steering-gear knuckles, and connecting rods, associated with the automobile chassis. The upper end of the said shaft 2, that is the portion extending out above the top of the standard 1, and designated by the numeral 3, is reduced diametrically thereby forming an offset 4. Upon the reduced portion 3, and abutting against the offset 4, is nonmovably fitted a disk-shaped supporting plate 5, said supporting plate having a central opening 6 engageably corresponding in diameter with the diameter of the reduced portion 3. Said supporting plate 5 being also provided, along the margin of the opening 6, with a series of key-seats 7 and also with a series of holes 8. Seating against the upper flat side of the supporting plate 5, and engaging the reduced portion 3 by means of a central opening 9, is non-movably fitted the hub 10 of a steering-wheel. Extending along one side of the reduced portion 3 is cut a suitable key-seat 11 registering with a key-seat 12 cut through the hub 10 at the margin of the opening 9, and also registering with one of the key-seats 7 of the supporting plate. Into said registering key-seats is fitted a key 13. To more securely retain the supporting plate 5 and the hub 10 upon the reduced portion 3, and against the offset 4, there is threaded a nut 14 upon the upper end of the reduced portion. Fitted downwardly into the holes 8 through the supporting plate 5, are suitable insulating bushings 15 provided with annular flanged heads 15ᵃ. The said heads 15ᵃ seating upon the upper side of the supporting plate 5 adjacent the holes 8. Said bushings 15 being provided with screw-bolt holes 16. Against the lower flat side of the supporting plate 5, and encircling the shaft 2 by means of a central opening 17, is fitted an insulating block 18, conforming, preferably, in shape to the supporting plate 5, provided with screw-bolt holes 19 registering centrally with the holes 8 in said supporting plate. Against the lower side of said insulating block 18, and also encircling the shaft 2 by means of an opening 20 extending through its inner end, is fitted a stabilizing member 21 having also screw-bolt holes 22 registering centrally with the screw-bolt holes 19 in the insulator 18. Said stabilizing member having an outwardly extending portion 23. Against the lower side of said stabilizing member 21, and also having its inner end encircling the shaft 2 by means of an opening 24 extending through said inner end, is fitted a contact member 25 having screw-bolt holes 26 registering with the said holes 19 in the insulator 18 and the holes 22 in the stabilizer 21, an intermediate flexible portion 27 and an outer portion 28. Said outer portion 28 terminating in two laterally extending arms 29, oppositely disposed, the outer edge of the whole, that is the outer edges of the arms 29 and portion 28 when taken together, forming an arc lying approximately in the plane of the steering-wheel. Said outer edge extending approximately along a line parallel with the inner side, or inner edge, of the rim 30, and is spaced a suitable distance inwardly therefrom. The outer ends 31 of the arms 29, extend a suitable distance across the upper side of two predetermined spokes 33 at a point indicated by 32, and are spaced a suitable and predetermined distance upwardly therefrom, and form two contact points operatively engageable for said two spokes for closing the circuit. The said two arms may be operated jointly and both of them closing and contacting with the spokes they are engageable with, at the same time, or they can be operated singly and either one independently of the other, at the option of the operator. If operated jointly, then the electric current would naturally become divided, a portion flowing along each of said arms and along the said two spokes to the hub 10, while if only one of said arms is operated for engagement with one of said spokes, then the electric current would flow only along the engaging arm.

35 is a reinforcing rib extending along the under side of the arms 29 and the outer portion 28 adjacent their outer or arcuated edges, and is adapted for the purpose of stiffening said arms and the portion 28, vertically. Said reinforcing rib may be in the form of a straight downwardly struck portion of the arms 29 and portion 28, and as shown in Figs. 2 and 6, or it can be made in the form of a tube, preferably tapering toward both ends, extending along said under side and as illustrated in the modified form shown in Fig. 11.

The contact lever 25, and the stabilizer 21, are carried and supported by the supporting plate 5, to which their inner ends are insulatingly secured by means of the insulating block 18, insulating bushings 15 and the screw-bolts 34. The stabilizer 21 being interposed between the insulating block 18 and the contact lever 25 merely as a matter of convenience of fastening said stabilizer. If so desired, it can be fastened to the insulating block 18, or to the contact lever, by other suitable means. The bushings 15 are intended to completely insulate electrically the screw-bolts 34 from the supporting plate 5.

The contact lever 25 is preferably cut out, or pressed out, of spring-steel, or spring-bronze, sheets of the desired thickness, however, any other suitable material can be used. It is intended that the upper flat side comprising the arms 29, and the outer portion of the contact lever 25, shall be of a uniform and even surface, and the arms preferably of one piece, and integral, with the contact lever. It is intended that the middle or intermediate portion 27 of the contact lever 25, shall have proper flexibility so that it will act in the capacity of a spring against the tension of which the outer end of the contact lever 27 and the arms 29 are pressed downwardly by the hand of the operator when closing the circuit, until one, or both, of the arms are operatively in engagement with the spokes 33 of the steering-wheel. The spring tension of the said flexible portion 27 causing the arms 29 to move upwardly and away from the said spokes 33 when the said pressure on the contact lever is released, thereby opening the circuit.

The said outwardly extending portion 23 of the stabilizer 21, is adapted as a backstop, against which the said contact lever bears when said lever is in normal and open circuit position, and it is also intended, and acts, as a steadier for said contact lever and to prevent undue vibration thereof which vibration may be caused by the pulsations of the automobile's motor, or by abnormal movements of the car received when passing over rough roads, or otherwise.

37 is an insulating member clamped upon one side of the standard 1, adjacent its upper end and in close relation to the steering-wheel, by means of a clamping band 38 having outstanding ears 39 through which is fitted a fastening screw-bolt 40. Said clamping band encircles both the standard and the insulating member 37. Said clamping band and said insulating member are nonmovable relative to said standard. Extending vertically through the insulating member 37 is a round hole 41 intersecting with a horizontal hole 42 extending out through the rear wall of the insulator. The lower portion of the hole 41 is reduced in size and is threaded and received the threaded shank portion of a screw 44 to which is fastened one end of a circuit wire 43, which wire is passed into said hole for that purpose. Within the intermediate middle portion of the hole 41 is disposed a spiral compression spring 45, the lower end of which spring seating upon the screw 44. Into the upper portion of the hole 41, and yieldingly supported by the spiral spring 45, is slidably fitted a contact brush 46. The upper end of said brush extends a suitable distance out above the top of the insulating member 37 and is in permanent brushing, or slidable, engagement with the lower flat side of the inner portion of the contact lever 25. The said brush forming a portion of the circuit means of the present invention.

The inner ends of the contact lever 25 and stabilizer 21, the insulating block 18, and the supporting plate 5, are all nonmovable relative to the steering-wheel and the steering-wheel shaft 2, but together with said steering-wheel and said shaft, are rotatably movable relative to the standard 1, insulating member 37, clamping band 39 and the brush 46.

The openings 17, 20 and 24, through the inner ends of said members, are intended to be large enough so that no portion of said members shall come in contact with the standard 1 or the shaft 2.

47 is an electrically operable warning horn, to one pole of which is secured the second end of the said circuit wire 43, while to the opposite pole of said horn is secured one end of a complementing circuit wire 43ª, the other end of said complementing wire being secured to a battery, or generator, 48. Said battery, or generator, being grounded to a suitable portion of the automobile's frame in good conductible contact with the shaft 2, or standard 1, by means of a grounding wire 49.

The operation of the invention being as follows—when it is desired to operate the horn or other electric signal, the operator presses downwardly upon the outer end of the contact member 25 until that member comes in contact with one, or both, of the metallic spokes 33 of the steering-wheel, thereby closing the circuit, permitting the current from the battery, or generator, 48 to flow over the wire 43ª to the horn 47, actuating it, and thence over the wire 43 to the screw 44, to the spring 45, brush 46, contact member 25, spokes 33, hub 10, through the shaft 2 and standard 1 to frame of the machine and thence along the ground wire 49 to the said battery, or generator, 48, completing the circuit.

One advantage of the present invention over devices that the applicant hereof has noted, and that may be classed as of a similar nature, is that with the present invention the fastening with the steering-gear is made at a point underneath the steering-wheel where it is out of the way, while the portion that is intended to be engaged by the hand of the operator is located above the steering-wheel where it is at all times readily engageable for closing the circuit. Another advantage is that it is comparatively light, requires no perceptible effort to operate, in fact a very light touch of the thumb will suffice to operate it.

I claim:

1. In a device of the kind described, including a disk-shaped supporting plate mounted upon the upper and reduced end of the steering-wheel shaft and above the upper end of the standard, an outstanding flexible contact lever supported by said supporting plate.

2. In a device of the kind described, including a disk-shaped supporting plate mounted upon the upper and reduced portion of the steering-wheel shaft and above the upper end of the standard, an outwardly extending flexible contact lever insulatingly supported by said supporting plate, said lever being operatively engageable with an outer portion of the steering-wheel for closing the circuit.

3. In a device of the kind described, including a disk-shaped supporting plate mounted upon the upper and reduced portion of the steering-wheel shaft and above the upper end of the steering-wheel standard, an outwardly extending flexible contact lever insulatingly secured to the lower flat side of said supporting plate, said lever being operatively engageable with a portion of the steering-wheel for closing the circuit.

4. In a device of the class described, including a disk-shaped supporting plate mounted upon the upper and reduced portion of the steering-wheel shaft and above the upper end of the steering-wheel standard, an outwardly extending flexible contact lever insulatingly secured to one of the flat sides of said supporting plate, said lever being operatively engageable with one, or both, of two predetermined spokes of the steering-wheel for closing the circuit.

5. In a device of the kind described, including a supporting plate mounted upon the upper and reduced portion of the steering-wheel shaft and above the upper end of the steering-wheel standard, and outwardly extending flexible contact lever having its inner end insulatingly and rigidly secured to one of the flat sides of said supporting plate, and its outer end terminating in two lateral oppositely disposed arms operatively engageable with portions of the steering-wheel for opening and closing the circuit.

6. In a device of the kind described, including a supporting plate mounted upon the upper and reduced portion of the steering-wheel shaft and below the steering-wheel hub, an outstanding flexible contact lever having an upper and a lower flat side, said lever having its inner end insulatingly and rigidly secured to said supporting plate, and its outer end terminating in two lateral oppositely disposed arms operatively engageable, each of which independently of the other, with the other side of two predetermined spokes of the steering-wheel, said arms being broader transversely at their inner ends than at their outer and free ends.

7. In a device of the kind described, including a rotatable steering-wheel and its shaft, said shaft having a reduced upper end forming an offset, a supporting plate mounted upon said reduced end and abutting against said offset, an outwardly extending flexible contact lever having its inner end insulatingly and rigidly secured to said supporting plate, and its outer end terminating in two oppositely disposed arms operatively engageable with the upper side of two predetermined spokes of said steering-wheel.

8. In an electric signaling device for automobiles and an electric circuit for the same, associated with the steering mechanism of the automobile, said steering mechanism forming a portion of said circuit and includes a stationary hollow standard, a rotatable shaft fitted into said standard, said shaft having its upper portion diametrically reduced thereby forming an offset, said reduced portion and offset being above the upper end of said standard, and a steering-wheel rigidly secured to the said reduced portion and carried by said shaft, a supporting plate mounted upon said reduced portion of said shaft and disposed between said offset and the hub of the said steering-wheel, in combination with an outwardly extending flexible contact lever having its inner end insulatingly supported by said supporting plate and its outer end which terminates in two oppositely disposed arms, operatively engageable by means of said arms, with two predetermined spokes of said steering-wheel for closing said circuit, and nonmovable means supported by said standard associating the inner portion of said contact lever with a portion of said circuit.

9. In a device of the kind described, the combination of a supporting plate supported by the steering-wheel shaft, an outstanding flexible contact lever having its inner end insulatingly secured to said supporting plate and its outer end operatively engageable with an outer portion of the steering-wheel, for closing the circuit, and a stabilizer disposed above the said contact lever and in bearing relation therewith, said stabilizer being also insulatingly secured to said supporting plate.

10. In a device of the kind described, the combination of supporting means carried by the steering-wheel shaft and nonmovable relative thereto, an outwardly extending flexible contact lever having its inner end insulatingly and rigidly secured to, and carried by, said supporting means, the outer end of said contact lever terminating in two oppositely disposed arms operatively engageable with two predetermined spokes of the steering-wheel, and a stabilizing element disposed above the contact lever and in engagement therewith, said stabilizing element being also insulated relative to said supporting means.

11. In a device of the class described, the combination of supporting means carried by the steering wheel shaft and non-movable relative thereto, an outwardly extending stabilizing element insulatingly secured by said supporting means, and an outwardly extending contact lever also insulatingly secured by said supporting means, for closing the circuit, said stabilizing element being operatively associated with said contact lever.

12. In a device of the kind described, the combination of a disk-shaped supporting plate fitted to the steering-wheel shaft, an insulating block fitted to the said supporting plate, a stabilizing member fitted to said insulating block, and a contact lever also fitted to said insulating block, said contact lever having an intermediate flexible portion and an outer portion terminating in two oppositely disposed arms operatively engageable with two predetermined spokes of the steering-wheel, as shown and described and for the purpose set forth.

13. In a device of the kind described, a supporting means carried by the steering-wheel shaft, an insulating block, carried by said supporting means, a stabilizing member carried by said insulating block, and a contact lever also carried by said insulating block, said contact lever having an intermediate flexible portion and an outer portion terminating in two oppositely disposed arms operatively engageable with two predetermined spokes of the steering-wheel, as shown and described and for the purpose set forth.

14. In a device of the kind described, including a supporting means carried by the rotatable portion of the steering-wheel assembly and being non-movable relative thereto, an outwardly extending flexible contact lever having its inner end carried insulatingly by said supporting means and being non-movable relative thereto and its outer end terminating in two oppositely disposed and transversely extending arms operatively engageable with two predetermined spokes of the steering-wheel, said arms being integral with the main body portion of said lever and are provided with flat upper surfaces and are broader at their inner ends than at their outer and free ends and are provided with a stiffening rib or element extending along their under sides adjacent their outer arcuated edges.

15. In a device of the character described, the combination with a flexible contact lever, said lever having its inner end insulatingly supported by supporting means carried by a central portion of the steering-wheel assembly and its outer and free end terminating in two oppositely disposed arms operatively engageable with two predetermined spokes of the steering-wheel whereby the circuit can be closed, said steering-wheel assembly, supporting means and the contact lever, being non-movable relative to each other, of a non-movable circuit wire terminal means supporting a circuit brush in continuous slidable contact with said contact lever, said steering-wheel assembly, supporting means and contact lever being together movable relative to said circuit wire terminal means and circuit brush.

16. In a device of the character described, including a circuit wire terminal brush supported by an insulating member supported by the steering-wheel standard, said brush being slidable longitudinally of itself and upwardly relative to said insulating member and the standard, a flexible contact lever for closing the circuit, said lever having an inner end rigidly and insulatingly secured to supporting means carried by a central portion of the steering-wheel assembly and an outer end terminating in two oppositely disposed arms operatively engageable with a portion of the steering-wheel assembly.

17. In a device of the character described, including a circuit wire terminal brush supported by an insulating member non-movably supported by the steering-wheel standard, said brush having a longitudinally slidable movement relative to said insulating member and said standard, and a disk-shaped supporting plate carried by the steering-wheel shaft, said plate being non-movable relative to said shaft, a flexible contact lever having its inner end supported insulatingly by said supporting plate and its outer end terminating in two oppositely disposed arms operatively engageable with two predetermined spokes of the steering-wheel whereby the circuit can be closed and opened and means for preventing undue vibration of said contact lever caused by vibrations of the automobile, said disk-shaped supporting plate, the steering-wheel shaft, the contact lever and the said means for preventing undue vibration of the said contact lever, being movable relative to said insulating member and its terminal brush.

18. In a device of the character described, including a hollow standard in which is rotatably fitted a shaft having a steering-wheel fixedly fitted upon its upper end, said steering-wheel being provided with a series of spokes, two of said spokes predetermined forming a portion of the switch and circuit means, a comparatively thin and flexible contact lever having its inner end insulatingly and fixedly connected to a central portion of the steering-wheel assembly and disposed above the upper end of the standard, the outer end of said contact lever being movable upwardly and downwardly relatively to said two spokes whereby one or both of said two spokes can be engaged or disengaged alternately thereby closing and opening the circuit, and a stabilizing member having its inner portion fixedly fitted to a central portion of the said steering-wheel assembly and its outward portion in bearing engagement with the upper side of said contact lever when said lever is in normal or open circuit position, said stabilizing member acting in the capacity of a stop against which said contact lever opens and stops by action of its spring tension as well as acting in the capacity of a steadier and stabilizer for said contact lever preventing undue vibration thereof which may be caused by the pulsations of the vehicle's motor or by movements of the vehicle such as are sometimes caused by the unevenness of the road over which the vehicle passes.

19. In combination with the steering mechanism of an automobile, comprising a stationary standard, a shaft rotatably disposed inside of said standard, and a steering-wheel mounted upon the upper end of said shaft, said steering-wheel having a central hub, and outer rim and a series of spokes associating said hub and said rim, of an electric signal circuit and circuit closer, comprising a circuit wire and its terminal, non-movably and insulatingly supported by said standard and in close relation to said steering-wheel, a supporting plate mounted upon the upper end of said steering-wheel shaft and below the steering-wheel hub, a flexible contact lever having its inner end insulating and rigidly supported by said supporting plate, and its outer end terminating in two oppositely disposed arms operatively engageable with two predetermined spokes of said steering-wheel and whereby said circuit can be closed, said shaft and its steering-wheel together with said flexible lever and its supporting plate are movable relative to said circuit wire and its terminal, and brushing means circuitly associating said movable contact lever with said non-movable wire and its terminal, said steering-wheel and its shaft forming a portion of said circuit means.

20. In means of the character set forth adapted to be mounted on the steering-wheel shaft of an automobile, the combination of a supporting plate, a flexible contact lever supported by said supporting plate, a stabilizer operatively associated with said contact lever, means for insulatingly mounting the said stabilizer and said contact lever on said supporting plate, a circuit wire terminal means non-movably secured to the upper end of said automobile's standard, and a brushing means electrically associating said flexible contact lever and said non-movable circuit wire terminal means.

21. The combination with an automobile steering-wheel and its shaft and a standard for the same, the shaft having a key-seat upon one side at its upper end, of a supporting plate mounted upon the upper end of the shaft adjacent the lower side of the steering-wheel, means engageable with the said key-seat for preventing the rotation of the supporting plate relative to the shaft, and means insulatingly supported by the supporting plate for closing the circuit.

22. The combination with an automobile steering-wheel and its shaft and a standard for the same, the shaft having a key-seat upon one side at its upper end, of a supporting plate mounted upon the upper end of the shaft adjacent the lower side of the steering-wheel, key-seat engaging means whereby the supporting plate is prevented from rotating upon the shaft, and a contact member insulatingly supported by the supporting plate and engageable with the steering-wheel for closing the circuit.

23. The combination with an automobile steering-wheel and its shaft and a standard for the same, the shaft having a key-seat adjacent its upper end, of a supporting plate mounted upon the shaft between the steering-wheel and the standard, means engageable with the said key-seat for preventing the rotation of the supporting plate relative to the shaft, and a flexible contact lever having a portion insulatingly supported by the supporting plate and a second portion engageable with the steering-wheel for closing the circuit.

24. The combination with an automobile steering-wheel and its shaft and a standard for the same, the shaft having an offset adjacent its upper end below the steering-wheel, of a relatively thin supporting member mounted upon the shaft below the steering-wheel and lying against the offset, means for preventing the rotation of the supporting member relative to the shaft, and a flexible contact lever having its inner end insulatingly supported by the supporting member and its outer end engageable with the steering-wheel for closing the circuit.

25. The combination with an automobile steering-wheel and its shaft and a standard for the same, the shaft having an offset adjacent its upper end below the steering-wheel, of a supporting plate mounted upon the shaft below the steering-wheel and lying against the offset, means for preventing the rotation of the supporting plate relative to the shaft, means insulatingly supported by the supporting plate and engageable with an outer portion of the steering-wheel for closing the circuit when moved in one direction, and means for limiting the movement of the second mentioned means in the opposite direction.

26. The combination with the steering-wheel and its shaft and the standard of an automobile, the shaft having an offset adjacent its upper end and below the steering-wheel, a supporting plate rigidly mounted upon the shaft and lying against the offset, a contact member having one section insulatingly supported by the supporting plate and a second section over-hanging a portion of the steering-wheel and engageable therewith for closing the circuit when moved downwardly, and means for limiting the upward movement of the contact member.

27. The combination with an automobile steering-wheel and its shaft and a standard for the same, the shaft having an offset below the steering-wheel, of a supporting plate nonrotatably mounted upon the shaft above the standard and lying against the offset, a flexible contact lever having an inner section insulatingly and rigidly connected to the supporting plate and a second section over-hanging an outer portion of the steering-wheel and engageable therewith for closing the circuit when moved downwardly, and means for limiting the upward movement of the contact lever.

28. The combination with an automobile steering-wheel and its shaft and a standard for the same, the shaft having an offset below the steering-wheel, of a supporting plate nonrotatably mounted upon the shaft below the steering-wheel and lying against the offset, a flexible contact lever having an inner section insulatingly and rigidly connected to the supporting plate and a second section over-hanging an outer portion of the steering-wheel and engageable therewith for closing the circuit when moved downwardly against the tension of itself, and means for limiting its upward rebound.

29. In a device of the character described, in combination with an automobile steering-wheel and shaft and standard for the same, the steering-wheel being mounted upon the upper end of the shaft and rigidly secured thereto by means of a key engaging key-seats in the shaft and steering-wheel, of a relatively thin supporting plate having an upper and a lower flat side, the plate being mounted upon the shaft between the standard and the steering-wheel and having its upper flat side lying against the steering-wheel hub and having a portion in engagement with the said key for preventing its rotation relative to the shaft, and means insulatingly supported by said supporting plate and having a portion over-hanging an outer portion of the steering-wheel and contactably engageable therewith for closing the circuit.

30. In a device of the character described, in combination with an automobile steering-wheel and shaft and standard for the same, of a relatively thin supporting plate having an upper and a lower flat side and nonrotatably mounted upon the shaft between the standard and the steering-wheel and having its upper flat side lying against the steering-wheel hub, an outwardly extending contact lever having its inner end insulatingly supported by the supporting plate and its outer end free and over-hanging a portion of the steering-wheel and engageable therewith for closing the circuit.

31. In a device of the character described, in combination with an automobile steering-wheel and shaft and standard for the same, of a relatively thin supporting plate having an upper and a lower flat side, the plate being mounted upon the shaft between the standard and the steering-wheel and has its upper flat side lying against the steering-wheel hub, means for preventing the rotation of the plate relative to the shaft, an outwardly extending flexible contact lever having its inner section insulatingly and rigidly supported by the supporting plate and its outer section free, a portion of its outer section over-hanging an outer portion of the steering-wheel and operatively engageable therewith when moved downwardly a proper distance, and means for limiting the upward movement of the outer section.

32. In a device of the character described, a disk-shaped supporting plate having an upper and a lower flat side, a flexible outstanding contact lever, the lever having an inner section insulatingly and rigidly secured to the supporting plate and an outer section free, a portion of the free section over-hanging an outer portion of the steering-wheel and operatively engageable therewith when pressed downwardly a proper distance, and against the tension of the lever, and means for limiting the rebound of the lever.

In testimony that I claim the foregoing as my own, I have hereto affixed my signature in the presence of two witnesses.

GEORGE F. VOIGHT.

Witnesses:
LORENZO FERREIROS,
A. L. KREUZBERGER.